March 8, 1960     R. B. BEARD     2,927,888
MEASURING APPARATUS

Original Filed Feb. 8, 1956     2 Sheets-Sheet 1

INVENTOR.
RICHARD B. BEARD

BY *Arthur H. Swanson*

ATTORNEY.

March 8, 1960  R. B. BEARD  2,927,888
MEASURING APPARATUS
Original Filed Feb. 8, 1956  2 Sheets-Sheet 2
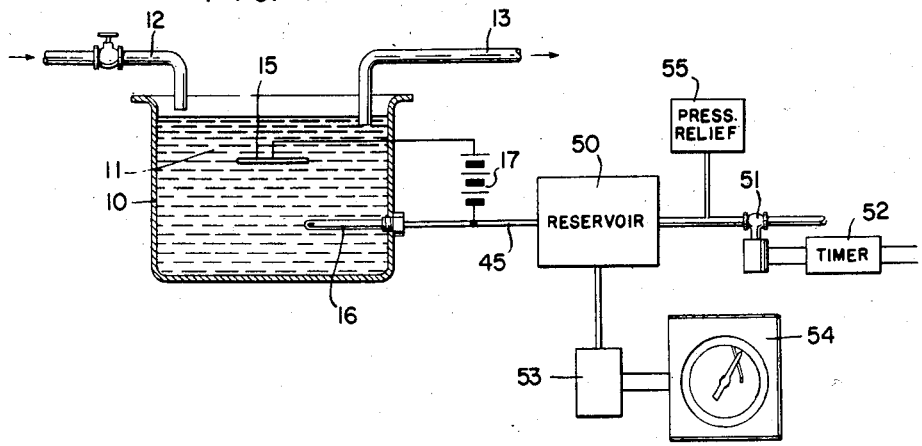
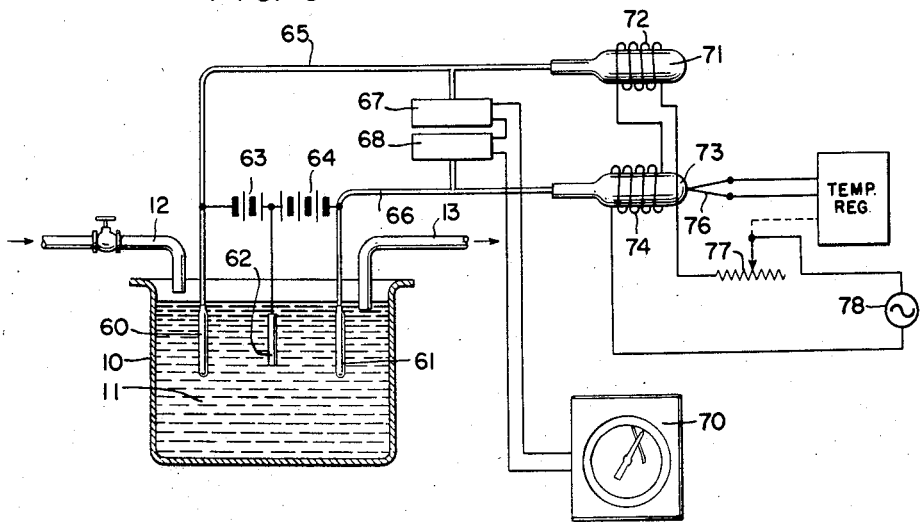
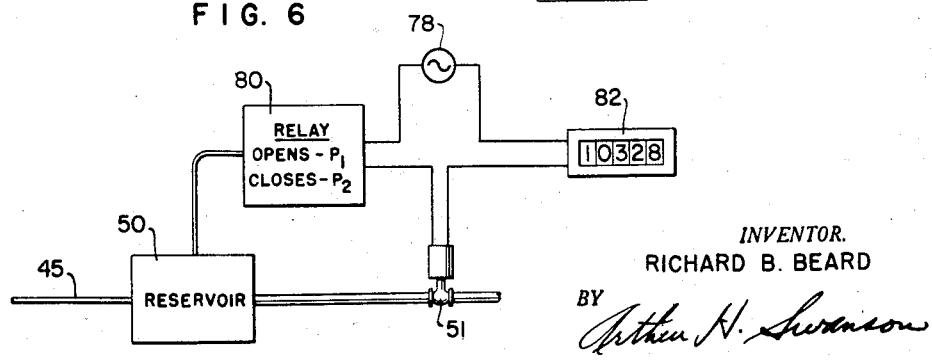
INVENTOR.
RICHARD B. BEARD
BY
ATTORNEY.

United States Patent Office

2,927,888
Patented Mar. 8, 1960

2,927,888

MEASURING APPARATUS

Richard B. Beard, Philadelphia, Pa., assignor to Minneapolis-Honeywell Regulator Company, Minneapolis, Minn., a corporation of Delaware Original application February 8, 1956, Serial No. 564,207, now Patent No. 2,882,212, dated April 14, 1959. Divided and this application June 17, 1958, Serial No. 742,524

3 Claims. (Cl. 204—195)

This application is a division of co-pending application Serial No. 564,207, filed February 8, 1956, in the name of Richard B. Beard, now Patent 2,882,212, patented April 14, 1959.

A general object of the present invention is to provide a new and improved apparatus for measuring the ion concentration of a preselected ion in a liquid. More specifically, the present invention is concerned with a new and improved apparatus for measuring the ionic concentration of a preselected ion in a liquid by means of an ion permeable membrane in combination with means for measuring the rate of permeation of the preselected ion through the membrane.

The preparation of many chemical solutions requires the measurement and control of the ionic concentration in the solution in order to attain a desired end product. The measurement of ion concentrations has been achieved in the past by devices of the electric potential generating type operating upon the principle of an electrolytic cell. These types of devices are extremely delicate and thereby subject to destruction under ordinary conditions of use. Further, these devices require considerable service and maintenance in order to keep them in an operating condition. The present invention is directed to an improved ion concentration measuring apparatus which overcomes the operating difficulties encountered with presently known types of ion concentration measuring devices.

It is well known that hydrogen will diffuse through certain types of metals very readily. This principle has been used in the measurement of hydrogen partial pressures in atmospheres under analysis. One metal which is particularly adapted for passing hydrogen is palladium. The rate at which hydrogen will pass through palladium is a function of the temperature as well as the concentration of the hydrogen present in the atmosphere under analysis.

The present invention is directed to an apparatus employing the selective permeability of an ion permeable member, such as palladium, and applying this principle to the measurement of ion concentrations in a fluid or a liquid. The ion permeable member is arranged with respect to the liquid under analysis such that the ions present in the liquid tend to migrate to the permeable member and diffuse therethrough at a rate which is a direct function of the ionic concentration of the selected ion in the liquid. The migration of the ions toward the permeable member is enhanced by the application of a potential which will move the selected ion toward the member and further enhance the ability of the ion to be sorbed onto the surface of the member, diffuse therethrough and then be desorbed on the other side thereof. This principle is combined with a further means for measuring the rate at which the ions move through the member to thereby indicate the concentration of the selected ion in the solution.

It is accordingly a more specific object of the present invention to provide a new and improved ion concentration measuring apparatus employing an ion permeable member with means for enhancing the movement of the selected ion toward the permeable member during the measuring operation.

Still another object of the present invention is to provide a new and improved ion concentration measuring apparatus incorporating a selectively permeable member arranged for positioning in a solution where a selected ion concentration is to be measured and applying an electrical biasing potential which is effective to cause migration of the selected ion toward said member to enhance the permeation of the selected ion through the member in combination with means for measuring the rate of permeation, said rate being indicative of the ion concentration in said fluid.

A still further more specific object of the present invention is to provide a new and improved ion concentration measuring apparatus incorporating means for producing a pressure indicative of the ion concentration.

Still another more specific object of the present invention is to provide a new and improved ion concentration measuring apparatus for a solution incorporating a pair of sensing means which are adapted to be connected so as to eliminate ambient temperature and pressure effects on the measuring apparatus.

The various features of novelty which characterize the invention are pointed out with particularity in the claims annexed to and forming a part of this specification. For a better understanding of the invention, its advantages, and specific objects attained with its use, reference should be had to the accompanying drawing and descriptive matter in which there is illustrated and described preferred embodiments of the invention.

Of the drawings:

Fig. 4 shows still another modified form of permeation rate measuring apparatus;

Fig. 5 shows a form of the present invention adapted for use where ambient temperatures and pressures must be eliminated; and Fig. 6 shows still another modified form of apparatus for measuring the permeation rate of the ion concentration sensing element.

Figure 1:
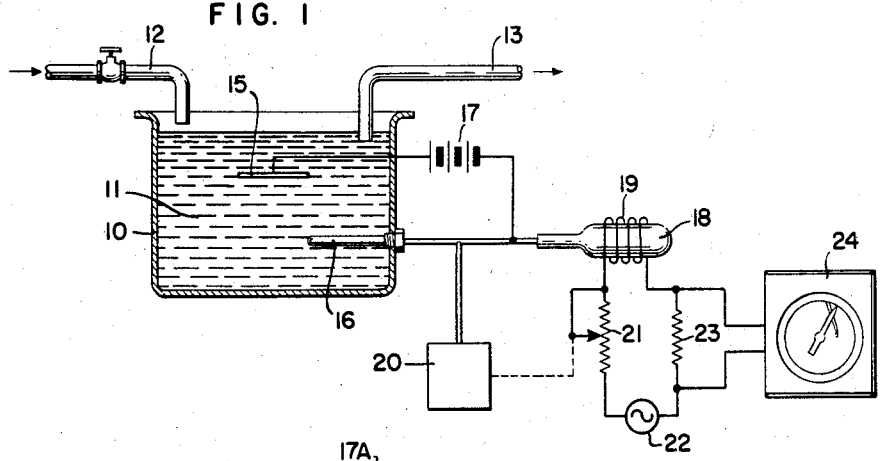
Fig. 1 is a diagrammatic showing of a representative form of the present invention.

Referring first to Fig. 1, the numeral 10 represents a container in which there is located a solution whose ion concentration is to be determined. The solution 11 is arranged to be supplied thereto by an inlet conduit 12 and removed therefrom by an outlet conduit 13. Positioned within the solution 10 are a pair of electrodes 15 and 16. Electrode 15 is an electrical conductor while the electrode 16 is a hollow ion permeable tube. In case of a solution where the hydrogen ion concentration is to be measured, the tube 16 would preferably be formed of palladium. In the case where oxygen ion concentration is to be determined, the tube 16 might well take the form of a silver tube. A battery 17 is shown connected to supply a biasing potential between the electrodes 15 and 16. The inside of the electrode tube 16 is arranged for connection to an outlet 18, the outlet 18 comprising a gaseous permeable tube or membrane arranged to be heated by an electrical heater 19. Also connected to the output of the tube 16 is a pressure transducer 20 whose output is adapted to position a rheostat 21 in series with the heater 19. The rheostat in turn will regulate the current flowing from a power source 22 to the heater 19. In series with the feed line to the heater 19 is a further resistor 23. The potential drop across the resistor 23 is applied to a suitable indicating and recording instrument 24, the latter of which may be conveniently calibrated in terms of ion concentration.

In considering the operation of Fig. 1, it is first assumed that the solution 11 is an electrolyte having a hydrogen ion concentration which is to be determined. Since the hydrogen ion concentration is to be determined, it is essential that the tube 16 be selected to be of the type which will be capable of readily diffusing hydrogen therethrough. Further, it is essential that the battery 17 be so polarized that the hydrogen ions will be attracted to the electrode 16. As the hydrogen ions are moved toward electrode 16, they are sorbed on the surface thereof, diffused therethrough, and desorbed on the inside thereof. This process or phenomena is a one way process so that the pressure within the tube 16 will continue to build up at a rate dependent upon the rate that the hydrogen ions diffuse into the tube. As the phenomena is irreversible, it is essential that there be an outlet for the hydrogen built up in the tube 16 and this is provided by the outlet 18. This outlet 18, in the case of hydrogen, is preferably formed of palladium and heated to readily pass the hydrogen into the atmosphere or into some other desirable space. The rate at which the gas will escape from the outlet 18 is determined by the temperature thereof and this is controlled by the amount of heat supplied thereto by the heater 19. The heater 19 is controlled by the pressure transducer 20 acting through the rheostat 21. The transducer 20 will try to maintain a constant pressure within the tube 16 and as the pressure increases, the transducer will increase the amount of heat supplied to the outlet 18 so that the pressure will drop. Conversely, if the pressure should decrease below the desired value, the transducer 20 will reset the rheostat 21 until the pressure within the system is back at the desired value. As the pressure within the system will be a direct function of the rate at which the hydrogen is being diffused into the tube 16, the maintaining of a constant pressure, as by the present form of the apparatus, will provide a means for determining the actual permeation rate through the tube 16. This is determined by the amount of heat required on tube outlet 18 to maintain a desired pressure within the system. The amount of heat may be measured by measuring the voltage drop across the resistor 23 in series with the energizing source 22 so that the voltage drop thereacross will be indicative of the current flow to the heater 19. This current flow will in turn be a function of the rate at which the hydrogen ions are being diffused into the tube 16.

Should the ion concentration in the solution 11 increase, the ions will diffuse into the tube 16 at a greater rate and thereby tend to increase the pressure within the tube and the rest of the pressure system. The transducer 20 will indicate that pressure increase and will readjust the rheostat so that more heat will be added to the outlet 18. Increased heat applied to the outlet 18 will decrease the pressure in the system to a desired value. The current to the heater 19 necessary to maintain that desired pressure condition will produce a voltage across the resistor 23 indicative of the ion concentration of the solution 11.

Should there be a decrease in the ion concentration within the solution 11, the pressure within the tube 16 will drop and the transducer 20 will respond to this pressure drop. The transducer 20 will be effective to reposition the rheostat 21 to decrease the amount of heat applied to the outlet 18 and thereby further restrict the outlet 18 so that the pressure will build up to the desired value. The decrease in the current flow to the heater 19 to effect this temperature decrease will produce a change in the signal across resistor 23 to thereby indicate the decrease in the ion concentration.

In the present form of the apparatus shown in Figure 1, it is desirable that the current concentration between the electrodes 15 and 16 remain constant. This requires constant spacing between the electrodes and the use of a constant current source by way of the battery 17.

Figure 2:
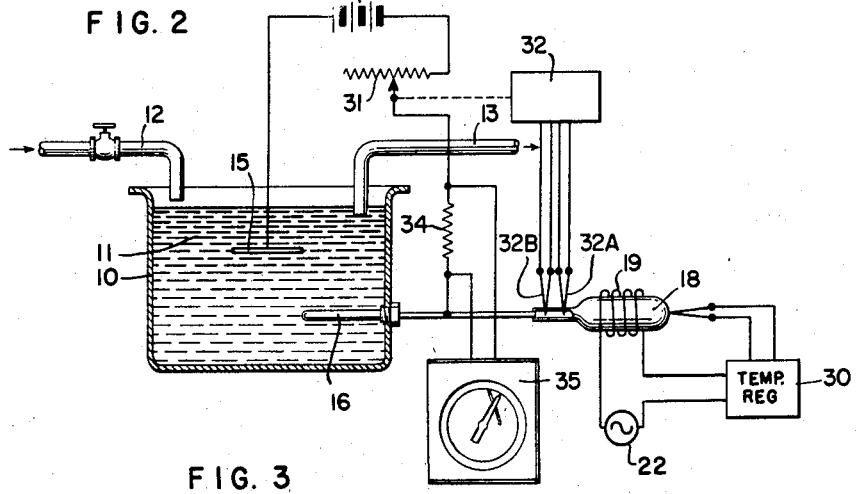
Fig. 2 is a modified form of the apparatus of Fig. 1 incorporating a different means for measuring the rate of permeation through the sensing membrane.

The apparatus of Figure 2 involves the same basic components as that of Fig. 1 and accordingly, corresponding components carry corresponding reference characters. The principle distinction between the apparatus of Fig. 1 and that of Fig 2 lies in the use of a pressure system outlet 18 whose temperature is maintained constant as by a temperature regulator 30. Further, the current density between the electrodes 15 and 16 is controlled by a rheostat 31, the latter of which is arranged to be adjusted in accordance with the partial pressure of the hydrogen present within the outlet tube 18. This hydrogen pressure is determined by a transducer 32. The transducer 32 comprises a pair of thermocouple elements 32A and 32B. One of these elements comprises a hydrogen concentration sensitive element whose thermoelectric output is proportional to the pressure of the hydrogen in the tube 18. This transducer 32 may well take the form of the transducer disclosed in the copending application of Richard B. Beard, Serial No. 389,418.

In series with a rheostat 31 is a resistor 34, the latter of which has a voltage drop thereacross proportional to the current flowing between the electrodes 15 and 16. This signal across the resistor 34 is applied to a suitable indicating and recording instrument 35. Also in series with resistor 34 and rheostat 31 is a source of power 17A, the latter not being of the constant current type.

The operation of Fig. 2 is basically similar to that of Fig. 1 in that current flowing between the electrodes 15 and 16 will cause a migration of the hydrogen ions therein so that the hydrogen will diffuse into the inside of the tube 16 and build up a pressure therein. The hydrogen passing into the tube 16 is passed out of the tube by way of the outlet 18, the latter of which is now acting as a constant restricted outlet whose temperature is maintained constant so as to maintain the constant outlet restriction characteristic. The pressure of the gas within the outlet chamber 18 is arranged to be measured by the transducer 32 which, as mentioned above, is of the thermoelectric type. This type of transducer is adapted to produce an output potential from a thermocouple positioned within the chamber which is proportional to the actual pressure of the hydrogen present within the chamber. The transducer 32 will then adjust the rheostat 31 so that the current flowing between the electrodes 15 and 16 will maintain the desired pressure within the system.

Should the ion concentration increase in the solution 11, the pressure within the chamber 16 will increase. This pressure increase will be indicated by the transducer 32 which will reset the rheostat 31 to decrease the current flowing between the electrodes 15 and 16. This decrease will result in a drop in the potential across the resistor 34 and the resultant signal recorded by the instrument 35 will then be proportional to the ion concentration in the solution.

If the ion concentration should decrease, the pressure within the electrode 16 and chamber 18 will decrease and this decrease will be sensed by the transducer 32 which in turn will adjust the rheostat so as to increase the current flow between the electrodes 15 and 16. The increased current flow will bring the pressure within the system back to the desired value and the change in current flow will be indicated by the potential drop across the resistor 34. This will in turn be indicated by the instrument 35 with the indication being proportional to the ion concentration of the solution.

Figure 3:
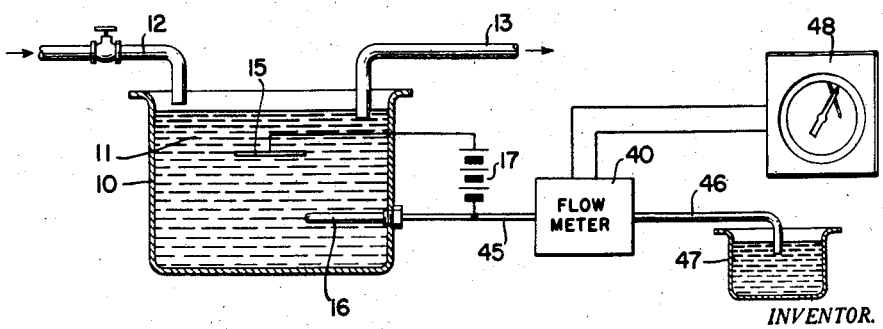
Fig. 3 shows a further modified form of apparatus for measuring the permeation rate of the ion concentration sensing element.

The apparatus of Fig. 3 shows another form of apparatus for measuring the rate at which the preselected ion is diffused through electrode 16. In this figure, the components corresponding to the components of Fig. 1 carry corresponding reference characters. Added to the present system for measuring the rate of diffusion is a flowmeter 40 connected in the output conduit 45 of the permeable electrode 16. The outlet from the flowmeter 40 flows through an outlet conduit 46 which is working against a constant head pressure in a container 47 which has liquid extending up over the end of the conduit 46. The output signal from the flowmeter 40 is arranged for connection to a suitable indicating and recording instrument 48.

In operation, the basic functioning of the apparatus of Fig. 3 is the same as that of Figs. 1 and 2 in that the current passing between the electrodes 15 and 16 will serve to move the hydrogen ions therein toward the electrode 16 so that these hydrogen ions may pass therethrough. The rate at which this diffusion will take place will be directly proportional to the concentration of the hydrogen ions in the solution 11. If the current between the electrodes is maintained constant by the battery 17, the only variable in the system will be the ion concentration in the solution 11. This will mean that the flow rate passing through the output conduit 45 will be a direct measure of the ion concentration so that the output of the meter 40, when indicating this flow rate, may be calibrated directly in terms of ion concentration.

The apparatus of Fig. 4 is again of the same basic nature as the apparatus of Fig. 1 and corresponding components carry corresponding reference characters. Added to the apparatus of Fig. 4 is a reservoir 50 which is connected to the output conduit 45 of the permeable electrode 16. The outlet of the reservoir 50 is controlled by a valve 51 and this valve 51 is in turn controlled by a timer 52. The pressure within the reservoir 50 is measured in accordance with its rate of change by a pressure rate of change to electric signal transducer 53. This latter transducer is arranged to have its output electrically connected to a suitable indicating and recording instrument 54.

In considering the operation of the Fig. 4 apparatus, it is first assumed that there is a constant current flowing between the electrodes 15 and 16 and that the hydrogen ions are being diffused into the electrode 16 in accordance with the ion concentration of the solution 11. As the hydrogen ions diffuse into the electrode 16, the pressure in the output reservoir 50 will build up and the rate at which it builds up will be a direct function of the rate at which the ions are diffusing through the electrode 16. The transducer 53 will measure the rate of change of the pressure in the reservoir 50 and produce an electrical signal in accordance with that rate of change which is recorded by the instrument 54. As the pressure in the reservoir will continue to build up, it is essential that after a period of time the pressure within the chamber should be let out and a new measuring cycle started. This may be controlled by the periodic opening of the valve 51 by the timer 52. For safety purposes, it may well be advisable to include with the apparatus a pressure overload relief valve 55.

It will be readily apparent that in the apparatus of Fig. 4 that if the ion concentration goes up in the solution 11, the rate of diffusion of the ions through the electrode 16 will be greater so that the rate of change of the pressure in the reservoir 50 will be greater. Conversely, if the concentration of the ions in the solution 11 should decrease, the rate of diffusion into the reservoir will decrease. These changes will be appropriately indicated by the instrument 54 to indicate directly the ion concentration of the solution 11.

The apparatus of Fig. 5 is a modification wherein the ambient temperature and pressure effects may be eliminated. In this form of the apparatus, there are provided a pair of electrodes of the selectively permeable type 60 and 61. These two electrodes may be positioned on opposite sides of the container 10 with a further electrode 62 positioned therebetween. A battery 63 is arranged to apply a potential between the electrodes 60 and 62 while a battery 64 is arranged to apply a potential between the electrodes 62 and 61. Electrode 60 has an output conduit 65 while the electrode 61 has an outlet conduit 66. Connected to the conduit 65 is a pressure to electric transducer 67 while connected to the conduit 66 is a pressure to electric transducer 68. The outputs of these two transducers are connected in opposition and the electrical signals are applied to a suitable indicating and recording instrument 70. The outlet for the conduit 65 is a selectively permeable outlet 71 having a heater 72 associated therewith. The outlet for the conduit 66 is a selectively permeable output 73, the latter having a heater 74. The temperature of the output 73 is arranged to be controlled by a temperature controller 75 having an input thermocouple 76 and an output connected to a rheostat 77, the latter of which is in series with the heaters 72, 74, and a source of power 78.

The operation of the apparatus of Fig. 5 is dependent upon the ionic diffusion characteristics of the aforementioned apparatus disclosed in Figs. 1 through 4. The use of two such systems in a single measurement permits the apparatus to be both temperature and pressure compensated. The current flowing between the electrode 62 and the electrode 60 is effective to cause a migration of the hydrogen ions to the electrode 60 and therethrough the output conduit 65 and thence to the outlet 71. The current from battery 64 will be flowing between the electrode 62 and the electrode 61 to cause a migration of the hydrogen ions to the electrode 61 and thence therethrough to the conduit 66. The conduit 66 is in turn arranged to be bled by the outlet 73. Both the outlets 71 and 73 are controlled to effectively the same temperature so that their restriction to the outlet flow will be the same from their respective conduits 65 and 66.

The battery 64 is larger than the battery 63 so as to establish different current densities between the respective electrodes. Thus, the current density between the electrodes 62 and 60 is arranged to be somewhat less than the current density between the electrode 62 and the electrode 61. This will mean that there is a tendency for a greater number of hydrogen ions to diffuse through the electrode 61 so that the pressure in the output conduit 66 will be higher than the pressure in the conduit 65. By opposing the output pressures in the conduit 65 against the pressure in the conduit 66, a differential pressure signal is produced on the output of the transducers 67 and 68 which is indicative only of the ion concentration. This will be readily apparent when it is noted that both ambient pressures and temperatures will be acting the same on the pressure systems associated with the electrodes 60 and 61.

The increase of the ion concentration within the solution 11 will be effective to increase the diffusion of the hydrogen ions in the both electrodes 60 and 61. Since the rate of diffusion in the electrode 61 will be greater than that into the electrode 60 with a proportionate change, the result will be a greater pressure difference between the output conduits 65 and 66. This difference will be indicated by an appropriate change in the output of the pressure transducers 67 and 68 and there will be a resultant change in the indication of the instrument 70. Conversely, if the ion concentration of the solution 11 should decrease, the rate of permeation in the electrodes 60 and 61 will decrease with the decrease being greater in the electrode 60 than in the electrode 61. This will result in a pressure change in the conduits 65 and 66 which, when reflected through the transducers 67 and 68, will produce an indication on the instrument 70 indicating a decreased ion concentration in the solution 11.

The apparatus of Fig. 6 is a modification of that shown in Fig. 4 and corresponding components carry corresponding reference characters. In this figure, a pressure sensitive relay switch means 80 has been added and this switch means comprises a pressure responsive unit which opens an electrical switch contact at a pressure $P_1$ and closes the switch contact at a pressure $P_2$. In series with the output of the switch means 80 is the valve 51 and a counter 82.

The apparatus of Fig. 6 operates basically the same as that of Fig. 4 in that the rate at which the pressure builds up in the reservoir 50 is a function of the ion concentration in the liquid being analyzed. When the pressure builds up to a given pressure $P_2$, the relay switch means 80 will close to complete an energizing circuit to the valve 51 so that the valve will open to bleed out the pressure in reservoir 50. When the pressure has dropped to pressure $P_1$, the relay switch means 80 will open its contacts to deenergize the valve 51. The pressure will then build up again to pressure $P_2$ at which time the valve 51 will again be opened. It will be readily apparent that the rate at which the valve 51 is opened and closed will be a function of the ion concentration of the liquid being examined. This rate may be determined by noting the reading of the counter 82, which is actuated each time the valve 51 is energized, over a given period of time. The differential of the pulse rate of valve 51 may also be used to indicate the ion concentration. This form of the apparatus is very simple in construction and thereby adapts itself to a very inexpensive, but nonetheless accurate, form of ion concentration measurement.

The principles of the present invention have been applied primarily to the measurement of hydrogen ion concentration. However, it will be readily apparent that the principles are equally applicable to other ion concentration measurements wherein the ions of the solution will diffuse through an associated electrode placed within the solution. In the case of an oxygen ion concentration measurement, a silver electrode may well be placed in the solution in the manner set forth in the foregoing description. It will be readily apparent that the polarity of the current source must be such as to cause a migration of the oxygen in the form of hydroxyl ions toward the silver electrode. Further, the outlets of such apparatus must be selected of a corresponding material, such as silver, in order to achieve a desired relation of the flow of the diffused oxygen through the pressure system.

While, in accordance with the provisions of the statutes, there has been illustrated and described the best forms of the invention known, it will be apparent to those skilled in the art that changes may be made in the form of the apparatus disclosed without departing from the spirit of the invention as set forth in the appending claims, and that in certain cases, certain features of the invention may be used to advantage without a corresponding use of other features.

Having now described the invention, what is claimed as new and for which it is desired to secure by Letters Patent is:

1. Apparatus for measuring oxygen concentration in a fluid having oxygen and non-oxygen constituents and having in combination: a container having an inlet thereto and an outlet therefrom for accommodating said fluid; an extended length of small-diameter, oxygen-permeable tube having a closed end and an open end, said oxygen-permeable tube barring the non-oxygen constituents of said fluid from the inside of said tube, so that the partial pressures of said non-oxygen constituents are not exerted on the inside of said tube; means for holding said small-diameter tube within said container, whereby the exterior surface and closed end of said tube are in contact with said fluid flowing through said container; an electrode within said container in contact with said fluid flowing through said container; a source of electrical potential connected to said electrode and to said tube and so polarized that the hydroxyl ions are attracted to said tube, the oxygen molecules sorbed on the surface thereof, diffused therethrough, and desorbed on the inside thereof; an oxygen-permeable membrane connected to the inside of said tube so as to receive the desorbed oxygen therein at a partial pressure, said oxygen-permeable membrane barring the non-oxygen constituents of the surrounding atmosphere from the inside of said tube, so that the partial pressures of said non-oxygen constituents are not exerted in the inside of said tube; an electrical heater arranged to heat said membrane and thereby to vary the oxygen permeability thereof; a source of electricity connected to said heater to supply power thereto; and means responsive to the pressure of the desorbed oxygen on the inside of the tube and on the inside of said membrane and operable to vary the power applied to said heater and, consequently, to vary the amount of said oxygen which passes through said membrane to the surrounding atmosphere.

2. Apparatus according to claim 1 wherein the oxygen-permeable tube is composed in major part of silver.

3. Apparatus according to claim 1 wherein the oxygen-permeable membrane is composed in major part of silver.

References Cited in the file of this patent

UNITED STATES PATENTS

| | | |
|---|---|---|
| 1,474,151 | Keeler | Nov. 13, 1923 |
| 2,444,222 | Craig | June 29, 1948 |
| 2,671,337 | Hulsberg | Mar. 9, 1954 |

OTHER REFERENCES

Thompson: "Electro-Chemistry," revised edition, 1925, page 127.

Thorne et al.: "Inorganic Chemistry," 4th ed., p. 400.